US012467232B2

(12) United States Patent
Nishikawara

(10) Patent No.: US 12,467,232 B2
(45) Date of Patent: Nov. 11, 2025

(54) EXCAVATOR

(71) Applicant: SUMITOMO CONSTRUCTION MACHINERY CO., LTD., Tokyo (JP)

(72) Inventor: Riichi Nishikawara, Chiba (JP)

(73) Assignee: SUMITOMO CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 18/642,158

(22) Filed: Apr. 22, 2024

(65) Prior Publication Data
US 2024/0271390 A1 Aug. 15, 2024

Related U.S. Application Data

(63) Continuation of application No. PCT/JP2022/040197, filed on Oct. 27, 2022.

(30) Foreign Application Priority Data

Oct. 29, 2021 (JP) .................................. 2021-177017

(51) Int. Cl.
*E02F 9/22* (2006.01)
(52) U.S. Cl.
CPC .......... *E02F 9/2203* (2013.01); *E02F 9/2292* (2013.01)
(58) Field of Classification Search
CPC . F15B 11/17; F15B 11/16; F15B 11/02; E02F 9/2239
See application file for complete search history.

(56) References Cited

U.S. PATENT DOCUMENTS

| | | | |
|---|---|---|---|
| 2005/0204734 A1* | 9/2005 | Oka | E02F 9/2239 60/428 |
| 2007/0028607 A1 | 2/2007 | Ishikawa et al. | |
| 2017/0204887 A1 | 7/2017 | Matsuzaki et al. | |

FOREIGN PATENT DOCUMENTS

| | | | | |
|---|---|---|---|---|
| EP | 3779212 | | 2/2021 | |
| JP | 2003-004005 | | 1/2003 | |
| JP | 2004-346485 | | 12/2004 | |
| JP | 2010071391 | A * | 4/2010 | |
| JP | 2010-174980 | | 8/2010 | |
| JP | 2013249849 | A * | 12/2013 | ............... F16D 9/06 |
| WO | 2016/056442 | | 4/2016 | |

OTHER PUBLICATIONS

International Search Report for PCT/JP2022/040197 mailed on Dec. 27, 2022.

* cited by examiner

Primary Examiner — Abiy Teka
(74) Attorney, Agent, or Firm — IPUSA, PLLC

(57) ABSTRACT

An excavator includes a lower travelling body, an upper rotating body mounted on the lower travelling body, an excavation attachment attached to the upper rotating body and including a boom, an arm, and a bucket, a control valve serving as a straight-travel valve, and a controller that is configured to control functioning of the control valve. The controller moves the control valve while at least two selected from the boom, the arm, and the bucket are moving simultaneously in a non-travelling state.

14 Claims, 7 Drawing Sheets

EXCAVATOR

CROSS-REFERENCE TO RELATED APPLICATIONS

This application is a continuation application of International Application No. PCT/JP2022/040197, filed on Oct. 27, 2022, and designating the U.S., which is based upon and claims priority to Japanese Patent Application No. 2021-177017, filed on Oct. 29, 2021, the entire contents of which are incorporated herein by reference.

BACKGROUND

Technical Field

The present disclosure relates to an excavator.

Background Art

An excavator that can move a plurality of hydraulic actuators simultaneously using an operating oil discharged from hydraulic pumps has been known.

SUMMARY

However, the excavator mentioned above is at a risk of occurrence of a wasteful pressure drop while a complex operation for moving two hydraulic actuators simultaneously is being performed, because load pressures on the two hydraulic actuators are different from each other, i.e., because a throttle that limits the flow rate of the operating oil to be supplied to the hydraulic actuator that is under the lower load is provided in order to reliably supply the operating oil to the hydraulic actuator that is under the higher load pressure.

In view of the above, it is desirable to provide an excavator that can reduce a pressure drop that may occur while a complex operation for moving at least two selected from a boom cylinder, an arm cylinder, and a bucket cylinder is being performed.

An excavator according to an embodiment of the present invention includes a lower travelling body, an upper rotating body mounted rotatably on the lower travelling body, an attachment attached to the upper rotating body and including a boom, an arm, and a bucket, a control valve that is configured to merge flows of an operating oil, which are discharged from a plurality of hydraulic pumps respectively, with each other, and a control device that is configured to control functioning of the control valve, wherein the control device moves the control valve while at least two selected from the boom, the arm, and the bucket are moving simultaneously in a non-travelling state.

The excavator described above can reduce a pressure drop that may occur while a complex operation for moving at least two selected from a boom cylinder, an arm cylinder, and a bucket cylinder is being performed.

DETAILED DESCRIPTION OF THE EMBODIMENTS

Figure 1:
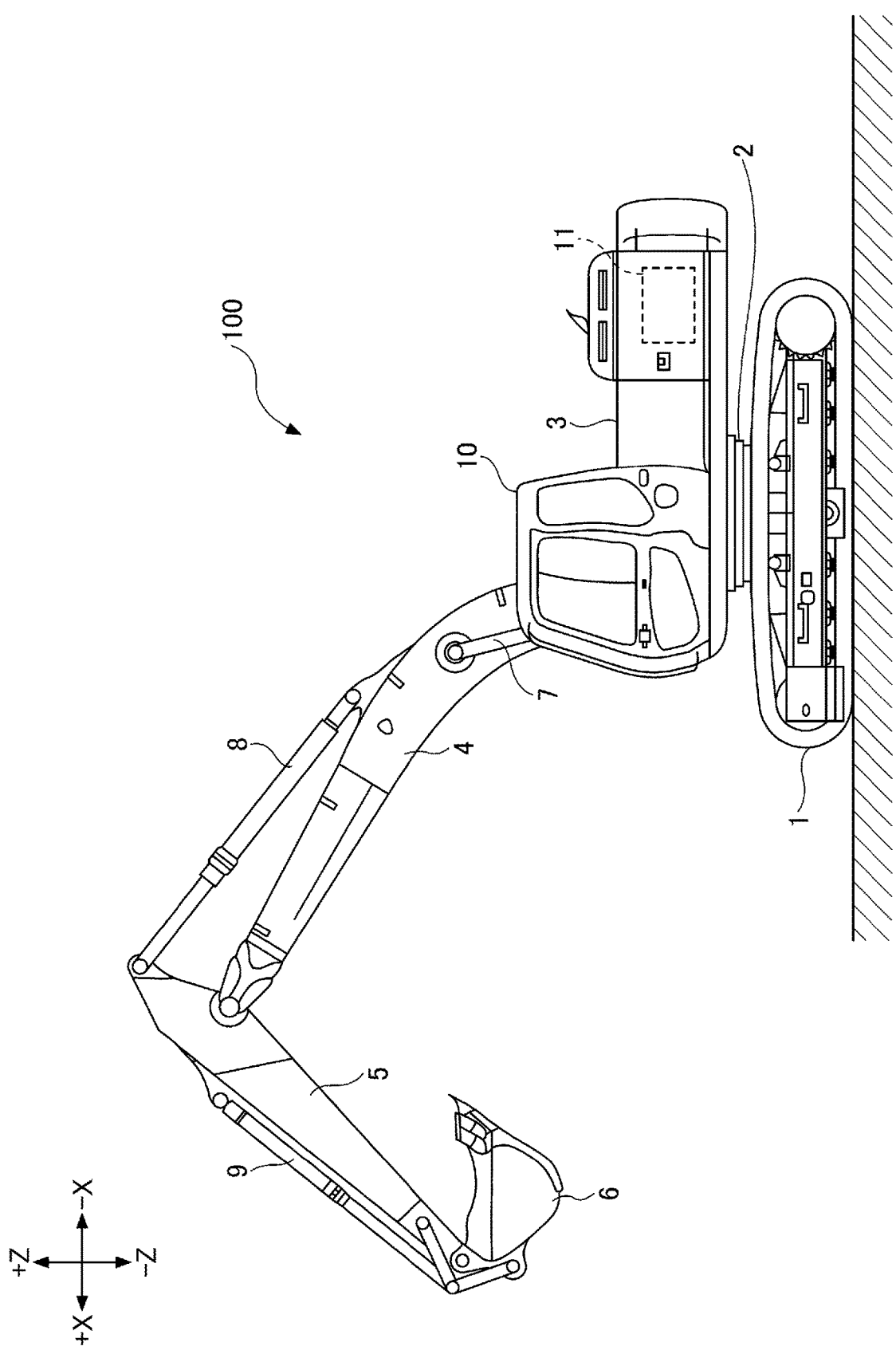
FIG. 1 is a side view of an excavator according to an embodiment of the present invention.

First, an excavator 100 as a construction machine according to an embodiment of the present invention will be described with reference to FIG. 1. FIG. 1 is a side view of the excavator 100. An upper rotating body 3 is mounted on a lower travelling body 1 of the excavator 100 illustrated in FIG. 1 such that the upper rotating body 3 can rotate via a rotating mechanism 2. A boom 4 serving as a working component is attached to the upper rotating body 3. An arm 5 serving as a working component is attached to an end of the boom 4, and a bucket 6 serving as a working component and an end attachment is attached to an end of the arm 5. The boom 4, the arm 5, and the bucket 6 form an excavation attachment, which is an example of the attachment. The boom 4 is driven by a boom cylinder 7, the arm 5 is driven by an arm cylinder 8, and the bucket 6 is driven by a bucket cylinder 9. A cabin 10 is situated on the upper rotating body 3, and a power source such as an engine 11 or the like is mounted on the upper rotating body 3.

Figure 2:
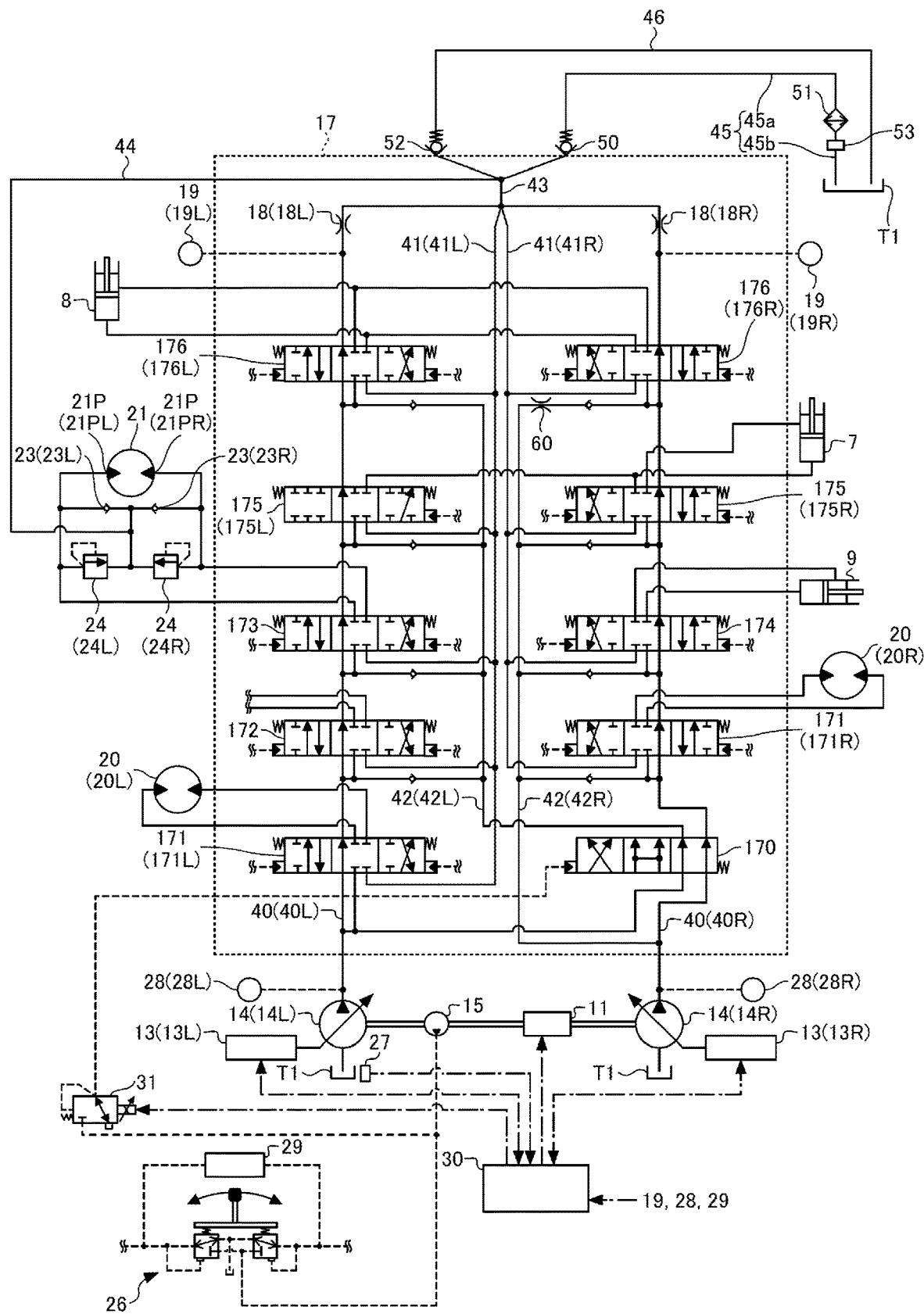
FIG. 2 is a schematic diagram illustrating an example of the configuration of a driving system mounted on the excavator of FIG. 1.

FIG. 2 is a diagram illustrating an example of the configuration of a driving system mounted on the excavator of FIG. 1. In FIG. 2, a mechanical power transmission line is denoted by a double line, operating oil lines are denoted by solid lines, pilot lines are denoted by broken lines, and electric control lines are denoted by dash-dot lines.

The driving system of the excavator 100 mainly includes the engine 11, pump regulators 13, main pumps 14, a pilot pump 15, an operation device 26, discharging pressure sensors 28, an operation sensor 29, a controller 30, and the like.

The engine 11 is an example of a power source of the excavator 100. The power source may be an electric motor, a fuel battery, a hydrogen engine, or the like. In the present embodiment, the engine 11 is a diesel engine that moves while maintaining a predetermined rotation rate. The output shaft of the engine 11 is coupled to the input shafts of the main pumps 14 and of the pilot pump 15.

The main pumps 14 are an example of the hydraulic pumps, and can supply an operating oil to a control valve unit 17. In the present embodiment, the main pumps 14 are swash plate-type variable-displacement hydraulic pumps, and include a left main pump 14L and a right main pump 14R.

The pump regulators 13 control the discharging amounts of the main pumps 14. In the present embodiment, the pump regulators 13 control the discharging amounts of the main pumps 14 by adjusting the tilt angles of the swash plates of the main pumps 14 in accordance with instructions from the controller 30. The pump regulators 13 may output information regarding the tilt angles of the swash plates to the controller 30. Specifically, the pump regulators 13 include a left pump regulator 13L that controls the discharging amount of the left main pump 14L and a right pump regulator 13R that controls the discharging amount of the right main pump 14R.

The pilot pump 15 supplies the operating oil to various hydraulic devices including the operation device 26. In the present embodiment, the pilot pump 15 is a fixed-displacement hydraulic pump. However, the pilot pump 15 may be omitted. In this case, the functions served by the pilot pump 15 may be realized by the main pumps 14. That is, the main pumps 14 may have a function for supplying the operating oil to the operation device 26 and the like after reducing the pressure of the operating oil via throttles or the like, aside from the function for supplying the operating oil to the control valve unit 17.

The control valve unit 17 accommodates a plurality of control valves such that the control valves can move. In the present embodiment, the control valve unit 17 includes the plurality of control valves that control the circulation of the operating oil discharged from the main pumps 14. The control valve unit 17 can supply the operating oil discharged from the main pumps 14 selectively to one or a plurality of hydraulic actuators via the control valves. The plurality of control valves control the flow rates of the operating oil flowing into the hydraulic actuators from the main pumps 14, and the flow rates of the operating oil flowing into an operating oil tank T1 from the hydraulic actuators. The hydraulic actuators include the boom cylinder 7, the arm cylinder 8, the bucket cylinder 9, travelling hydraulic motors 20, and a rotating hydraulic motor 21. The travelling hydraulic motors 20 include a left travelling hydraulic motor 20L and a right travelling hydraulic motor 20R.

The rotating hydraulic motor 21 is a hydraulic motor that rotates the upper rotating body 3. Oil paths 21P connected to the ports of the rotating hydraulic motor 21 are connected to an oil path 44 via relief valves 24 and check valves 23. Specifically, the oil paths 21P include a left oil path 21PL and a right oil path 21PR. The relief valves 24 include a left relief valve 24L and a right relief valve 24R. The check valves 23 include a left check valve 23L and a right check valve 23R.

The left relief valve 24L opens in response to the pressure of the operating oil in the left oil path 21PL reaching a predetermined relief pressure, and expels the operating oil in the left oil path 21PL to the oil path 44. The right relief valve 24R opens in response to the pressure of the operating oil in the right oil path 21PR reaching a predetermined relief pressure, and expels the operating oil in the right oil path 21PR to the oil path 44.

The left check valve 23L opens in response to the pressure of the operating oil in the left oil path 21PL becoming lower than the pressure of the operating oil in the oil path 44, and replenishes the operating oil into the left oil path 21PL from the oil path 44. The right check valve 23R opens in response to the pressure of the operating oil in the right oil path 21PR becoming lower than the pressure of the operating oil in the oil path 44, and replenishes the operating oil into the right oil path 21PR from the oil path 44. The check valves 23 functioning in this way can replenish the operating oil to the ports on the suctioning side during braking of the rotating hydraulic motor 21.

The operation device 26 is a device used by an operator to operate the hydraulic actuators. In the present embodiment, the operation device 26 is a hydraulic type, and supplies the operating oil discharged from the pilot pump 15 to the pilot ports of the control valves corresponding to the respective hydraulic actuators through the pilot lines. The pilot pressure, which is the pressure of the operating oil to be supplied to each pilot port, is a pressure matching the direction in which and the amount by which a lever or a pedal forming the operation device 26 and corresponding to any hydraulic actuator is operated. However, the operation device 26 may be an electric type.

Specifically, the operation device 26 includes a left operation lever, a right operation lever, a left travelling lever, a right travelling lever, a left travelling operation pedal, a right travelling pedal, and the like. The left operation lever functions as an arm operation lever and a rotating operation lever. The right operation lever functions as a boom operation lever and a bucket operation lever. In the following description, either or both of the left operation lever and the right operation lever may be referred to as "an attachment operation device", and at least one selected from the left travelling lever, the right travelling lever, the left travelling pedal, and the right travelling pedal may be referred to as "a travelling operation device". The left travelling lever and the right travelling lever may be referred to as "travelling levers", and the left travelling pedal and the right travelling pedal may be referred to as "travelling pedals". Either or both of the left travelling lever and the left travelling pedal may be referred to as "a left travelling operation device", and either or both of the right travelling lever and the right travelling pedal may be referred to as "a right travelling operation device".

A temperature sensor 27 detects the temperature of the operating oil in the operating oil tank T1, and outputs the detected value to the controller 30.

The discharging pressure sensors 28 detect the discharging pressures of the main pumps 14 and output the detected values to the controller 30. In the present embodiment, the discharging pressure sensors 28 include a left discharging pressure sensor 28L that detects the discharging pressure of the left main pump 14L, and a right discharging pressure sensor 28R that detects the discharging pressure of the right main pump 14R.

The operation sensor 29 is a device that detects the content of an operation performed by the operator via the operation device 26. The content of an operation includes, for example, an operation direction, an operation amount (operation angle), and the like. In the present embodiment, the operation sensor 29 is a pressure sensor that detects, in the form of a pressure, the direction in which and the amount by which a lever or a pedal forming the operation device 26 and corresponding to any hydraulic actuator is operated, and outputs the detected value to the controller 30. The content of an operation via the operation device 26 may be detected using an output from a device other than a pressure sensor, such as an operation angle sensor, an acceleration sensor, an angular velocity sensor, a resolver, a voltmeter, an ammeter, and the like.

The controller 30 is an example of a processing circuit, and functions as a control device that controls the excavator 100. In the present embodiment, the controller 30 is constituted by a computer including a CPU, a volatile memory device, a nonvolatile memory device, and the like.

An electromagnetic valve 31 is situated on a conduit line that connects the pilot pump 15 to the pilot port of a control valve 170 in the control valve unit 17, and can change the flow area of the conduit line. In the present embodiment, the electromagnetic valve 31 is an electromagnetic proportional control valve that functions in accordance with a control instruction output from the controller 30. Hence, the controller 30 can supply the operating oil discharged from the pilot pump 15 to the pilot port of the control valve 170 serving as a straight-travel valve via the electromagnetic valve 31 irrespective of an operation performed by the operator via the operation device 26. Then, the controller 30 can cause a pilot pressure generated by the electromagnetic valve 31 to act on the pilot port of the control valve 170.

Center bypass oil paths 40 are operating oil lines that pass through the control valves situated in the control valve unit 17, and include a left center bypass oil path 40L and a right center bypass oil path 40R.

The control valve 170 is a spool valve serving as a straight-travel valve. In principle, the control valve 170 remains still in a non-travelling state of the excavator 100. In the present embodiment, the control valve 170 switches the circulation of the operating oil such that the operating oil is supplied to the travelling hydraulic motors 20 from the main pumps 14 in such a suitable manner that the straight travelling performance of the lower travelling body 1 can be improved. Specifically, the valve position of the control valve 170 is switchable between a first valve position and a second valve position in accordance with a control instruction from the controller 30.

More specifically, the valve position of the control valve 170 is at the first valve position while travelling operation devices are only being operated or while attachment operation devices are only being operated, and is at the second valve position while travelling operation devices and attachment operation devices are simultaneously being operated. As described above, in principle, the control valve 170 remains still in the non-travelling state of the excavator 100. That is, the valve position of the control valve 170 is kept at the first valve position unless travelling operation devices and attachment operation devices are simultaneously operated.

Figure 3:
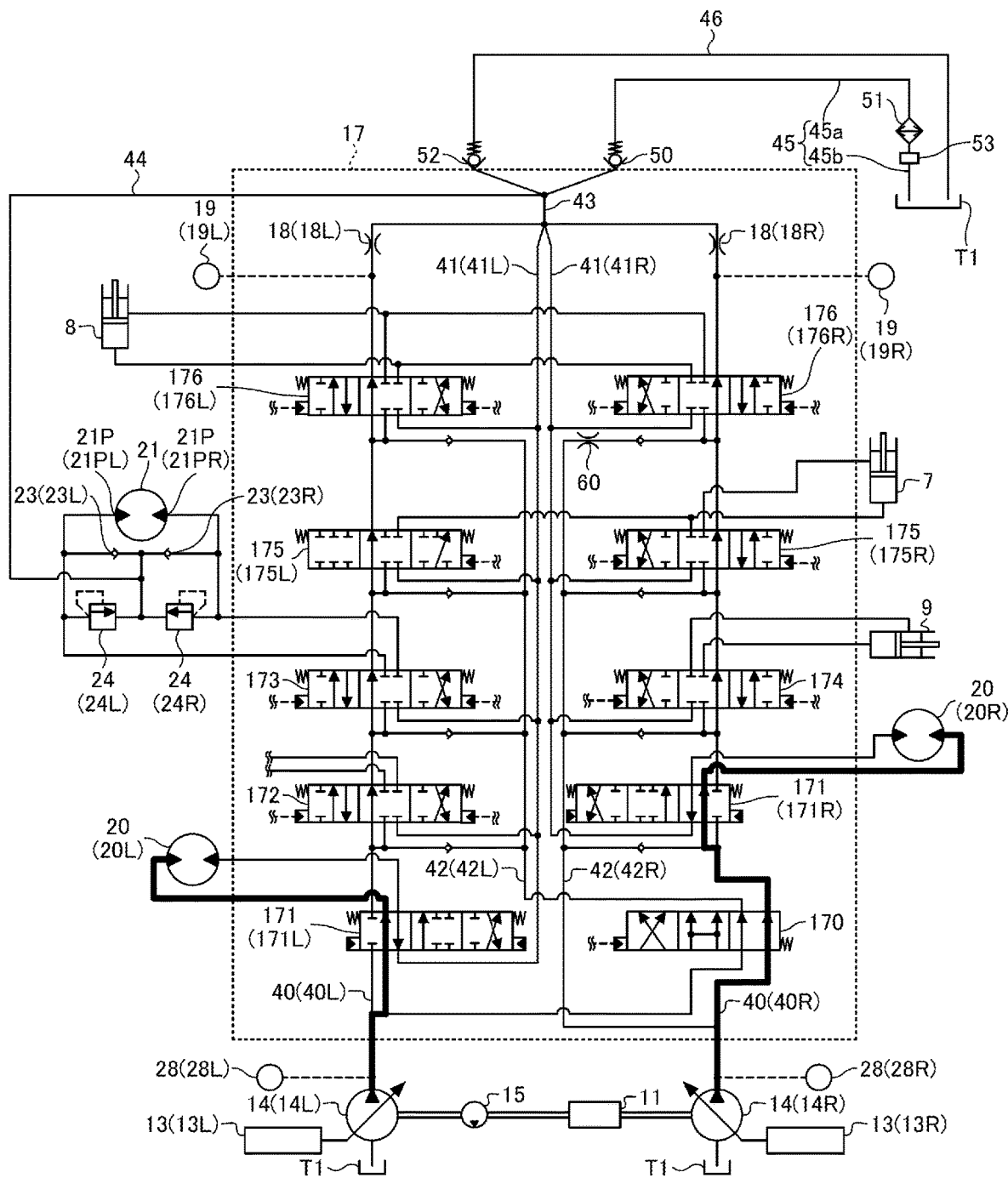
FIG. 3 is a diagram illustrating a state of the driving system while the excavator is travelling.

The first valve position is a valve position at which the left main pump 14L and the left travelling hydraulic motor 20L are brought into communication with each other, and the right main pump 14R and the right travelling hydraulic motor 20R are brought into communication with each other. FIG. 3 illustrates a state of the driving system in a case of performing operations only on travelling operation devices and switching the control valve 170 to the first valve position. Specifically, FIG. 3 illustrates a state of the driving system while the left travelling lever and the right travelling lever are being operated in the forward travelling direction by the same operation amount. In this state, the left main pump 14L can supply the operating oil to the left travelling hydraulic motor 20L, and the right main pump 14R can supply the operating oil to the right travelling hydraulic motor 20R. For clarity, FIG. 3 denotes the operating oil flowing from the left main pump 14L to the left travelling hydraulic motor 20L and the operating oil flowing from the right main pump 14R to the right travelling hydraulic motor 20R by bold solid lines.

Figure 4:
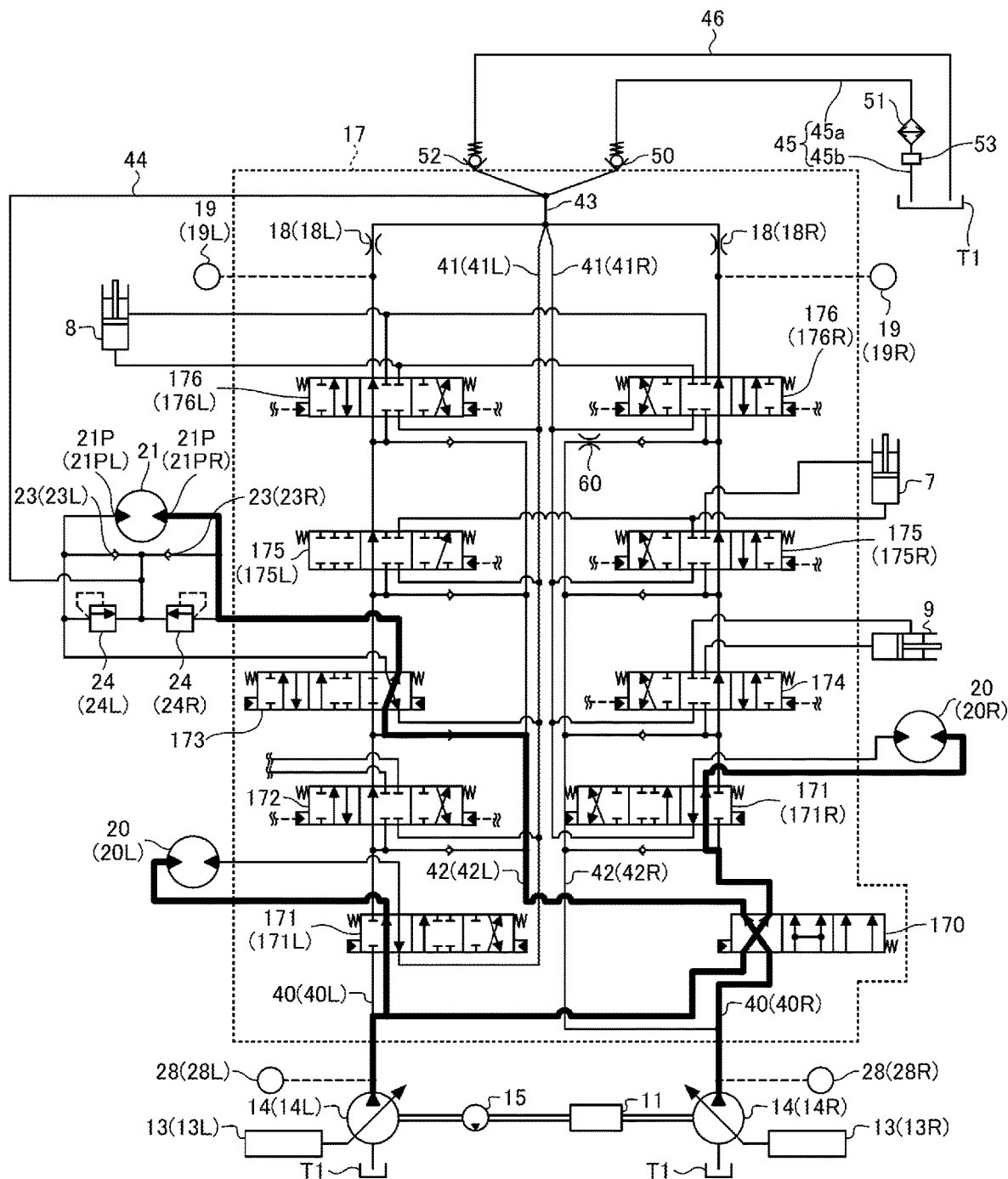
FIG. 4 is a diagram illustrating a state of the driving system while the excavator is rotating while travelling.

The second valve position is a valve position at which the left main pump 14L is brought into communication with each of the left travelling hydraulic motor 20L and the right travelling hydraulic motor 20R. FIG. 4 illustrates a state of the driving system while travelling operation devices and an attachment operation device are simultaneously being operated and the valve position of the control valve 170 is at the second valve position. Specifically, FIG. 4 illustrates a state of the driving system while the left travelling lever and the right travelling lever are being operated in the forward travelling direction by the same operation amount, and the left operation lever serving as the rotating operation lever is being operated in the right rotating direction. In this state, the left main pump 14L can supply the operating oil to each of the left travelling hydraulic motor 20L and the right travelling hydraulic motor 20R. For clarity, FIG. 4 denotes the operating oil flowing from the left main pump 14L to each of the left travelling hydraulic motor 20L and the right travelling hydraulic motor 20R, and the operating oil flowing from the right main pump 14R to the rotating hydraulic motor 21 by bold solid lines.

The control valve 170 can merge the operating oil discharged from the left main pump 14L and the operating oil discharged from the right main pump 14R with each other when its valve position is at a middle valve position between the first valve position and the second valve position.

The controller 30 can supply the operating oil discharged from the pilot pump 15 to the pilot port of the control valve 170 serving as a straight-travel valve by outputting a control instruction (e.g., an instruction by an electric current) to the electromagnetic valve 31 in accordance with an operation performed by the operator via the operation device 26 or irrespective of an operation performed by the operator via the operation device 26. Then, the controller 30 can cause a pilot pressure generated by the electromagnetic valve 31 to act on the pilot port of the control valve 170. Hence, the controller 30 can switch the valve position of the control valve 170 between the first valve position and the second valve position at a desirably selected timing.

Control valves 171 are spool valves that switch the circulation of the operating oil in order to supply the operating oil discharged from the main pumps 14 to the travelling hydraulic motors 20 and expel the operating oil discharged from the travelling hydraulic motors 20 to the operating oil tank. Specifically, the control valves 171 include a control valve 171L and a control valve 171R. The control valve 171L switches the circulation of the operating oil in order to supply the operating oil discharged from the left main pump 14L to the left travelling hydraulic motor 20L and expel the operating oil discharged from the left travelling hydraulic motor 20L to the operating oil tank. The control valve 171R switches the circulation of the operating oil in order to supply the operating oil discharged from the left main pump 14L or the right main pump 14R to the right travelling hydraulic motor 20R and expel the operating oil discharged from the right travelling hydraulic motor 20R to the operating oil tank.

A control valve 172 is a spool valve that switches the circulation of the operating oil in order to supply the operating oil discharged from the left main pump 14L to an optional hydraulic actuator and expel the operating oil discharged from the optional hydraulic actuator to the operating oil tank. The optional hydraulic actuator is, for example, a grapple opening/closing cylinder.

A control valve 173 is a spool valve that switches the circulation of the operating oil in order to supply the operating oil discharged from the left main pump 14L to the rotating hydraulic motor 21 and expel the operating oil discharged from the rotating hydraulic motor 21 to the operating oil tank.

A control valve 174 is a spool valve that supplies the operating oil discharged from the right main pump 14R to the bucket cylinder 9 and expels the operating oil in the bucket cylinder 9 to the operating oil tank.

Control valves 175 are spool valves that switch the circulation of the operating oil in order to supply the operating oil discharged from the main pumps 14 to the boom cylinder 7 and expel the operating oil in the boom cylinder 7 to the operating oil tank. Specifically, the control valves 175 include a control valve 175L and a control valve 175R. The control valve 175L moves only when an operation to raise the boom 4 is performed, and does not move when an operation to lower the boom 4 is performed.

Control valves 176 are spool valves that switch the circulation of the operating oil in order to supply the operating oil discharged from the main pumps 14 to the arm cylinder 8 and expel the operating oil in the arm cylinder 8 to the operating oil tank. Specifically, the control valves 176 include a control valve 176L and a control valve 176R.

In the present embodiment, the control valves 170 to 176 are pilot-type spool valves, but may be electromagnetic spool valves in a case where the operation device 26 is an electric type.

In a case where the operation levers serving as the operation device 26 are electric types, an amount of a lever operation is input into the controller 30 in the form of an electric signal. An electromagnetic valve is situated between the pilot pump 15 and the pilot port of each of the control valves. The electromagnetic valve functions in accordance with an electric signal from the controller 30. By the electromagnetic valve functioning in this way, the controller 30 can control the electromagnetic valve by means of an electric signal that matches the amount of a lever operation in response to a manual operation using an operation lever being performed, and can thereby increase or decrease the pilot pressure and move each control valve. Each control valve may be constituted by an electromagnetic spool valve as described above. In this case, the electromagnetic spool valve moves in accordance with an electric signal from the controller 30 matching the amount of a lever operation performed on an electric-type operation lever.

Returning oil paths 41 are operating oil lines situated in the control valve unit 17, and include a left returning oil path 41L and a right returning oil path 41R. The operating oil that has flowed out of a hydraulic actuator and passed the control valves 171 to 176 flows toward the operating oil tank T1 by passing through the returning oil paths 41.

Parallel oil paths 42 are operating oil lines extending in parallel with the center bypass oil paths 40. In the present embodiment, the parallel oil paths 42 include a left parallel oil path 42L extending in parallel with the left center bypass oil path 40L, and a right parallel oil path 42R extending in parallel with the right center bypass oil path 40R. The left parallel oil path 42L can supply the operating oil to the control valves that are on the downstream side of the control valve 171L, 172, 173, or 175L when the circulation of the operating oil passing through the left center bypass oil path 40L is limited or interrupted by the control valve 171L, 172, 173, or 175L. The right parallel oil path 42R can supply the operating oil to the control valves that are on the downstream side of the control valves 171R, 174, or 175R when the circulation of the operating oil passing through the right center bypass oil path 40R is limited or interrupted by the control valves 171R, 174, or 175R.

A throttle 60 is a fixed throttle situated on a position of the right parallel oil path 42R that is on the upstream side of the control valve 176R and on the downstream side of a branching point at which an oil path that joins the right parallel oil path 42R and the control valve 175R branches from the right parallel oil path 42R. In the illustrated example, for example, the throttle 60 has a function for preventing the operating oil discharged from the right main pump 14R from mostly flowing into the arm cylinder 8 that is under a low load pressure while the arm cylinder 8 that is under the low load pressure and a hydraulic actuator (at least one selected from the boom cylinder 7, the bucket cylinder 9, and the right travelling hydraulic motor 20R) that is under a high load pressure are simultaneously being operated. The throttle 60 can function in this way because it can increase the pressure on the operating oil on its downstream side when the operating oil is going to flow into the arm cylinder 8 through the control valve 176R. Hence, even while, for example, the arm cylinder 8 under a low load pressure and the boom cylinder 7 under a high load pressure are being simultaneously operated, the driving system including the throttle 60 can reliably drive not only the arm cylinder 8 under the low load pressure but also the boom cylinder 7 under the high load pressure. The same applies in a case where the arm cylinder 8 that is under a low load pressure and the bucket cylinder 9 or the right travelling hydraulic motor 20R that is under a high load pressure are being simultaneously operated.

Here, negative control employed by the driving system of FIG. 2 will be described. Throttles 18 are situated on positions of the center bypass oil paths 40 that are respectively between the most downstream control valves 176 and the operating oil tank T1. The circulation of the operating oil discharged from the main pumps 14 is limited by the throttles 18. The throttles 18 generate control pressures (negative control pressures) for controlling the pump regulators 13. Specifically, the throttles 18 are fixed throttles having a fixed opening area, and include a left throttle 18L and a right throttle 18R. The throttles 18 tend to have a higher stability to a sudden change in a control pressure as the opening area is larger. The throttles 18 tend to have a higher responsiveness to a control pressure as the opening area is smaller. The circulation of the operating oil discharged from the left main pump 14L is limited by the left throttle 18L. Then, the left throttle 18L generates a control pressure for controlling the left pump regulator 13L. Likewise, the circulation of the operating oil discharged from the right main pump 14R is limited by the right throttle 18R. Then, the right throttle 18R generates a control pressure for controlling the right pump regulator 13R.

Control pressure sensors 19 are sensors that detect control pressures (negative control pressures) generated on the upstream side of the throttles 18, and include a left control pressure sensor 19L and a right control pressure sensor 19R. In the present embodiment, the control pressure sensors 19 output detected values to the controller 30. The controller 30 outputs instructions corresponding to the control pressures to the pump regulators 13. The pump regulators 13 control the discharging amounts of the main pumps 14 by adjusting the swash plate tilt angles of the main pumps 14 in accordance with the instructions. Specifically, the pump regulators 13 regulate the discharging amounts of the main pumps 14 to be lower as the control pressures are higher, and regulate the discharging amounts of the main pumps 14 to be higher as the control pressures are lower.

By the negative control, the driving system of FIG. 2 can suppress wasteful energy consumption in the main pumps 14 while none of the hydraulic actuators are being operated. Wasteful energy consumption includes a pumping loss generated in the center bypass oil paths 40 by the operating oil discharged from the main pumps 14. It is ensured that while any hydraulic actuator is being operated, a necessary and sufficient operating oil can be reliably supplied to the hydraulic actuator, which is the target being operated, from the main pumps 14.

The center bypass oil paths 40 and the returning oil paths 41 are connected on the downstream side of the throttles 18 to a junction to an oil path 43. The oil path 43 bifurcates on the downstream side of the junction, to be connected to an oil path 45 and to an oil path 46 that are outside the control valve unit 17. That is, flows of the operating oil flowing respectively through the center bypass oil paths 40 and the returning oil paths 41 arrive at the operating oil tank T1 by passing through the oil path 45 or the oil path 46 after merging with each other in the oil path 43. The oil path 43 is also connected to the rotating hydraulic motor 21 through the oil path 44, which is the operating oil line for making up any shortage in the operating oil on the suctioning side of the rotating hydraulic motor 21.

The oil path 45 is an operating oil line connecting the oil path 43 and the operating oil tank T1. A check valve 50, an oil cooler 51, and a filter 53 are situated on the oil path 45.

The check valve 50 is a valve that opens in response to a pressure difference between the primary side and the secondary side becoming higher than a predetermined valve-opening pressure difference. In the present embodiment, the check valve 50 is a spring-type non-return valve, and opens and flows the operating oil out of the control valve unit 17 into the oil cooler 51 in a case where the pressure on the upstream side is higher than the pressure on the downstream side and the pressure difference is higher than the valve-opening pressure difference. The check valve 50 functioning in this way can maintain the pressures on the operating oil in the oil path 43 and the oil path 44 at a level higher than the valve-opening pressure, and ensures reliable makeup for any shortage in the operating oil on the suctioning side of the rotating hydraulic motor 21. In this case, the valve-opening pressure is the lower limit of the back-pressure with respect to the throttles 18. The back-pressure with respect to the throttles 18 increases as the flow rate of the operating oil passing through the check valve 50 increases. The check valve 50 may be combined with the control valve unit 17, or may be omitted. In a case where the check valve 50 is omitted, a pressure drop in each of the oil path 45, the oil cooler 51, and the filter 53 forms the back-pressure with respect to the throttles 18, and the back-pressure with respect to the throttles 18 increases as the flow rate of the operating oil passing through the oil path 45 increases.

The oil cooler 51 is a device that cools the operating oil circulating through the driving system. In the present embodiment, the oil cooler 51 is included in a heat exchanger unit, which is cooled by a cooling fan driven by the engine 11. The heat exchanger unit includes a radiator, an intercooler, the oil cooler 51, and the like. In the present embodiment, the oil path 45 includes an oil path portion 45a connecting the check valve 50 and the oil cooler 51, and an oil path portion 45b connecting the oil cooler 51 and the operating oil tank T1. The filter 53 is situated on the oil path portion 45b.

The oil path 46 is a bypass oil path that bypasses the oil cooler 51. In the present embodiment, one end of the oil path 46 is connected to the oil path 43, and the other end thereof is connected to the operating oil tank T1. The one end may be connected to the oil path 45 between the check valve 50 and the oil cooler 51. A check valve 52 is situated on the oil path 46.

Like the check valve 50, the check valve 52 is a valve that opens in response to a pressure difference between the primary side and the secondary side becoming higher than a predetermined valve-opening pressure difference. In the present embodiment, the check valve 52 is a spring-type non-return valve, and opens and flows the operating oil out of the control valve unit 17 into the operating oil tank T1 in a case where the pressure on the upstream side is higher than the pressure on the downstream side and the pressure difference is higher than the valve-opening pressure difference. The valve-opening pressure difference of the check valve 52 is higher than the valve-opening pressure difference of the check valve 50. Hence, the operating oil in the control valve unit 17 flows first through the check valve 50, and flows next through the check valve 52 in the event of a pressure increase to a level higher than the valve-opening pressure due to any resistance in flowing through the oil cooler 51. The check valve 52 may be combined with the control valve unit 17.

Figure 5:
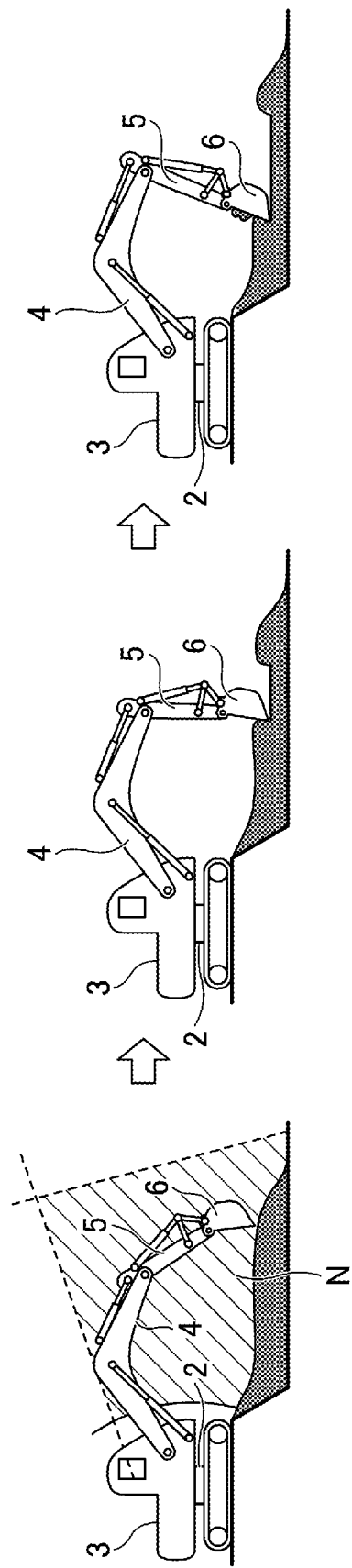
FIG. 5 is a diagram illustrating the flow of a plowing-out work.
Figure 6:
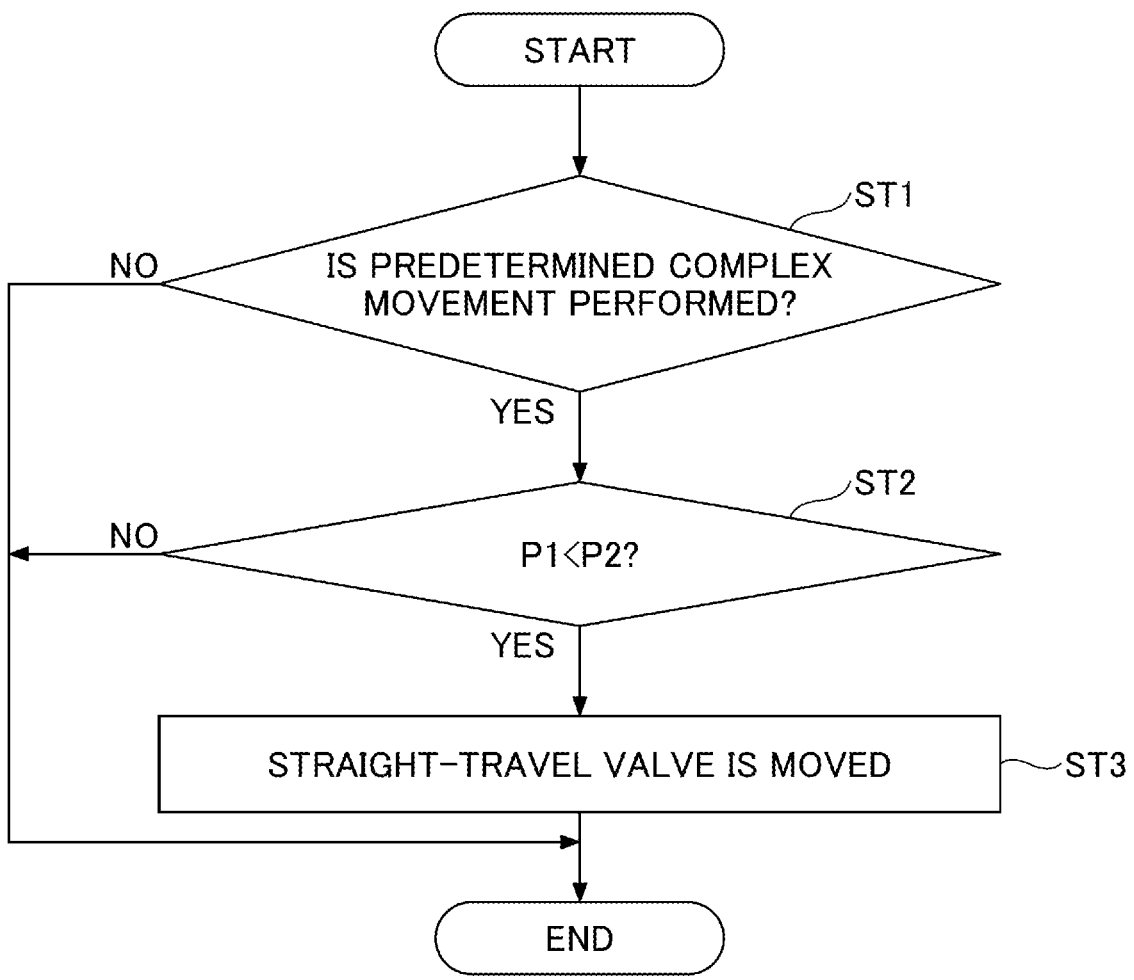
FIG. 6 is a flowchart illustrating the flow of an example of a pressure drop inhibiting process.

Next, a pressure drop inhibiting process will be described with reference to FIG. 5 and FIG. 6. The pressure drop inhibiting process is a process for inhibiting a pressure drop that may occur in an operating oil line while a predetermined complex movement is being performed. FIG. 5 is a diagram illustrating the flow of a plowing-out work, which is an example of a work realized by a complex movement including an arm closing movement and a boom raising movement, which is an example of the predetermined complex movement. The plowing-out work is a work for scraping off extra undulations on the surface of the ground to a flat state. FIG. 6 is a flowchart illustrating the flow of the pressure drop inhibiting process. The controller 30 performs the pressure drop inhibiting process repeatedly at a predetermined control cycle.

As illustrated on the left side of FIG. 5, first, the operator positions the end of the bucket 6 such that the end of the bucket 6 comes to a desired height position from the ground, which is the working target, in a work area N of the excavation attachment (the boom 4, the arm 5, and the bucket 6) serving as a working device. For example, the work area N means an area that is within reach of the end of the bucket 6. Here, the bucket 6 is in an opening state (which is, for example, a state of the bucket 6 being at a bucket angle of 90 degrees or greater). The bucket angle is, for example, the degree of opening from the maximumly closed state of the bucket 6 (i.e., a pivoting angle of the bucket 6 about a bucket pin).

Next, as illustrated in the center of FIG. 5, the operator starts the plowing-out work by closing the arm 5 while gradually raising the boom 4. Specifically, the operator performs an arm closing movement by a full lever operation on the arm operation lever, and a boom raising movement by a micro-operation or a half lever operation on the boom operation lever.

The micro-operation means, for example, an operation by a lever operation amount that is less than 20% on the assumption that a lever operation amount when the operation lever is at a neutral position is 0% and a lever operation amount when the operation lever is maximumly inclined is 100%. The full lever operation means, for example, an operation by a lever operation amount that is 80% or greater. The half lever operation means, for example, an operation by a lever operation amount that is 20% or greater and less than 80%. In the following description, the micro-operation and the half lever operation may be collectively referred to as "non-full lever operations".

Next, as illustrated on the right side of FIG. 5, the operator continues the plowing-out work by closing the arm 5 while gradually raising the boom 4 from the state illustrated in the center of FIG. 5. Specifically, the operator continues the arm closing movement by a full lever operation on the arm operation lever, and continues the boom raising movement by a micro-operation or a half lever operation of the boom operation lever. As a result, extra undulations on the surface of the ground are scraped off to a flat state by the end of the claw of the bucket 6.

In a case where the pressure drop inhibiting process is not performed in the plowing-out work, the operating oil discharged from the left main pump 14L arrives at the control valve 176L through each of the left center bypass oil path 40L and the left parallel oil path 42L, and then arrives at a bottom-side oil chamber of the arm cylinder 8 through the control valve 176L. Part of the operating oil discharged from the right main pump 14R arrives at the control valve 176R through the right parallel oil path 42R, and then arrives at the bottom-side oil chamber of the arm cylinder 8 through the control valve 176R. Another part of the operating oil discharged from the right main pump 14R arrives at the control valve 175R through the right parallel oil path 42R, and then arrives at a bottom-side oil chamber of the boom cylinder 7 through the control valve 175R. The discharging amounts of the left main pump 14L and the right main pump 14R are increased to the maximum discharging amounts through the negative control, because the arm operation lever is in a full lever operation.

With the cross-section of the flow path of the right parallel oil path 42R being narrowed by the throttle 60, the right parallel oil path 42R leading to the control valve 176R applies a higher pressure on the operating oil on the upstream side of the throttle 60 than the pressure applied on the operating oil on the downstream side of the throttle 60, in order to prevent the operating oil discharged from the right main pump 14R from being inhibited from flowing into the boom cylinder 7 due to the operating oil discharged from the right main pump 14R mostly flowing into the arm cylinder 8 in a complex movement (first complex movement) including: an arm closing movement realized by a micro-operation or a half lever operation on the arm operation lever; and a boom raising movement realized by a micro-operation or a half lever operation on the boom operation lever, i.e., in order to prevent the boom raising movement from slowing down in spite of the load on the complex movement being low.

However, the operating oil discharged from the right main pump 14R experiences a pressure drop when the operating oil passes through the throttle 60. The pressure drop is higher, as the flow rate of the operating oil discharged from the right main pump 14R is higher. The pressure drop occurring at the throttle 60 is particularly high in a plowing-out work realized by a complex movement (second complex movement) including: an arm closing movement realized by a full lever operation on the arm operation lever; and a boom raising movement realized by a micro-operation or a half lever operation on the boom operation lever. Here, the lever operation amount of the boom operation lever in the second complex movement is smaller than the lever operation amount of the boom operation lever in the first complex movement. This also entails a smaller opening area of a PC port (pump-cylinder port) of the control valves 175, resulting in a higher pressure drop in the oil paths on the right main pump 14R side.

Hence, the excavator 100 according to the present embodiment reduces pressure drop that occurs at the throttle 60 by performing the pressure drop inhibiting process in a case of performing a predetermined complex movement such as the complex movement in the plowing-out work. Specifically, the controller 30 mounted on the excavator 100 outputs a control instruction to the electromagnetic valve 31 to control the control valve 170, which remains non-moving in a non-travelling state in principle, to move exceptionally, to thereby reduce pressure drop occurring at the throttle 60.

More specifically, as illustrated in FIG. 6, the controller 30 determines whether a predetermined complex movement is performed or not (step ST1). In the illustrated example, the controller 30 determines whether a predetermined complex movement is performed or not based on an output from the operation sensor 29. The predetermined complex movement includes the complex movement for realizing the plowing-out work. The complex movement for realizing the plowing-out work is, for example, a complex movement including: an arm closing movement realized by a full lever operation on the arm operation lever; and a boom raising movement realized by a micro-operation or a half lever operation on the boom operation lever. The controller 30 may determine whether a predetermined movement is performed or not based on an output from any other sensor than the operation sensor 29. For example, the controller 30 may determine whether a predetermined complex movement is performed or not based on an output from a boom angle sensor, an arm angle sensor, a bucket angle sensor, and the like, or based on an output from an image sensor such as a space recognition device (a camera or a LIDAR) mounted on the upper rotating body 3 and the like.

In a case of determining that no predetermined complex movement is performed (step ST1: NO), the controller 30 terminates the current pressure drop inhibiting process, because it can be estimated that no pressure drop that should be reduced is occurring in the operating oil lines.

In a case of determining that a predetermined complex movement is performed (step ST1: YES), the controller 30 compares the discharging pressure P1 of the left main pump 14L and the discharging pressure P2 of the right main pump 14R (step ST2). In the illustrated example, the controller 30 determines whether or not the discharging pressure P2 of the right main pump 14R detected by the right discharging pressure sensor 28R is higher than the discharging pressure P1 of the left main pump 14L detected by the left discharging pressure sensor 28L.

In a case of determining that the discharging pressure P2 is not higher than the discharging pressure P1 (step ST2: NO), i.e., in a case of determining that the discharging pressure P2 is lower than or equal to the discharging pressure P1, the controller 30 terminates the current pressure drop inhibiting process, because it can be estimated that no pressure drop that should be reduced is occurring in the operating oil lines.

On the other hand, in a case of determining that the discharging pressure P2 is higher than the discharging pressure P1 (step ST2: YES), the controller 30 moves the control valve 170 serving as a straight-travel valve (step ST3). In the illustrated example, the controller 30 outputs a control instruction to the electromagnetic valve 31, to set the valve position of the control valve 170 at the middle valve position between the first valve position and the second valve position. As a result, the operating oil discharged from the left main pump 14L and the operating oil discharged from the right main pump 14R merge at the control valve 170, and the discharging pressure P1 and the discharging pressure P2 become the same value. In this case, the discharging pressure P1 after the control valve 170 is moved is higher than the discharging pressure P1 before the control valve 170 is moved, and the discharging pressure P2 after the control valve 170 is moved is lower than the discharging pressure P2 before the control valve 170 is moved. The discharging pressure P1 and the discharging pressure P2 being the same value may include the differential pressure between the discharging pressure P1 and the discharging pressure P2 being lower than a previously set predetermined value.

Figure 7:
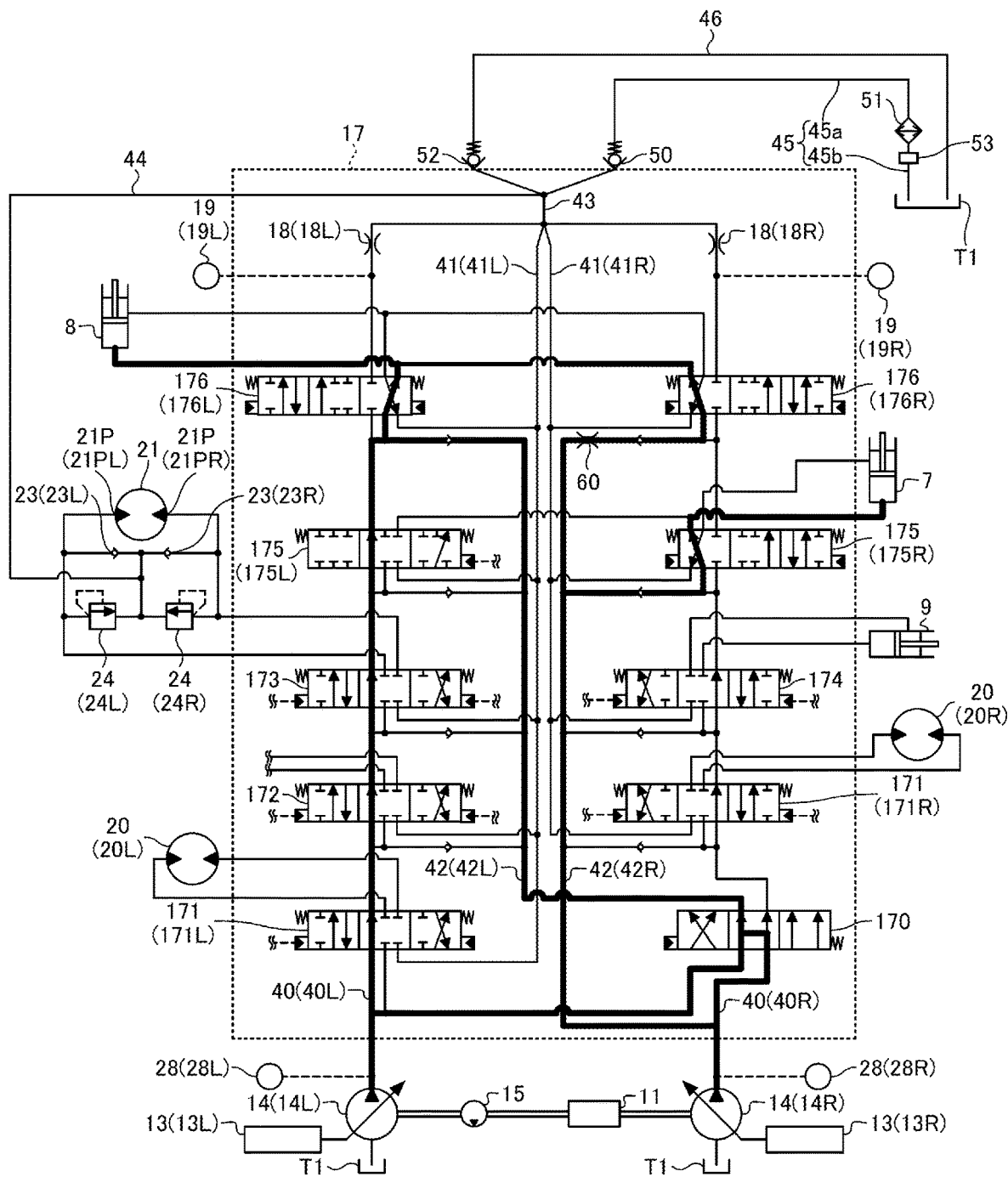
FIG. 7 is a drawing illustrating a state of the driving system while a plowing-out work is being performed.

FIG. 7 illustrates, for example, a state of the driving system while the plowing-out work is being performed. Specifically, FIG. 7 illustrates a state of the driving system when the valve position of the control valve 170 is positioned at the middle valve position while a complex movement including a boom raising movement by a half lever operation and an arm closing movement by a full lever operation is being performed. For clarity, FIG. 7 denotes the operating oil flowing into the bottom-side oil chamber of the arm cylinder 8 from the left main pump 14L, and the operating oil flowing into the bottom-side oil chamber of the arm cylinder 8 and into the bottom-side oil chamber of the boom cylinder 7 from the right main pump 14R by bold solid lines.

As illustrated in FIG. 7, when the valve position of the control valve 170 is positioned at the middle valve position, part of the operating oil discharged from the right main pump 14R passes through the right center bypass oil path 40R, the control valve 170, and the left parallel oil path 42L to arrive at the control valve 176L, and then passes through the control valve 176L to arrive at the bottom-side oil chamber of the arm cylinder 8. Another part of the operating oil discharged from the right main pump 14R passes through the right parallel oil path 42R to arrive at the control valve 176R, and then passes through the control valve 176R to arrive at the bottom-side oil chamber of the arm cylinder 8. Yet another part of the operating oil discharged from the right main pump 14R passes through the right parallel oil path 42R to arrive at the control valve 175R, and then passes through the control valve 175R to arrive at the bottom-side oil chamber of the boom cylinder 7. In this state, no pressure drop occurs at the throttle 60, because the discharging pressure P1 of the left main pump 14L and the discharging pressure P2 of the right main pump 14R have become the same value, i.e., the pressure of the operating oil on the upstream side of the throttle 60 and the pressure of the operating oil on the downstream side of the throttle 60 have become the same value.

By performing the pressure drop inhibiting process in this way, i.e., by positioning the valve position of the control valve 170 at the middle valve position while a predetermined complex movement is being performed, the controller 30 can suppress pressure drop occurring in the operating oil line. Moreover, the excavator 100 can avoid making the movement of the excavation attachment unstable due to including the configuration that can realize the pressure drop inhibiting process, because the pressure drop inhibiting process is realized by the configuration including the throttle 60, i.e., because the throttle 60 can, also in the configuration that can realize the pressure drop inhibiting process, inhibit or prevent the operating oil, which should flow into the hydraulic actuator under a high load pressure (boom cylinder 7), from flowing into the hydraulic actuator under a low load pressure (arm cylinder 8).

The controller 30 may determine that the discharging pressure P2 is higher than the discharging pressure P1 in a case where the differential pressure between the discharging pressure P2, which is higher than the discharging pressure P1, and the discharging pressure P1 is higher than or equal to a previously set predetermined value. That is, the controller 30 may determine that the discharging pressure P2 is not higher than the discharging pressure P1 even in a case where the discharging pressure P2 is higher than the discharging pressure P1 as long as the differential pressure between them is lower than the predetermined value.

The controller 30 may maintain the control valve 170 at the moved state until a predetermined cancel condition becomes satisfied after the control valve 170 serving as a straight-travel valve is moved. That is, even after the discharging pressure P1 and the discharging pressure P2 become the same value after the valve position of the control valve 170 is positioned at the middle valve position, the controller 30 may maintain the valve position of the control valve 170 positioned at the middle position unless the predetermined cancel condition becomes satisfied, in order to maintain the state of the pressure drop being reduced. In the illustrated example, the predetermined cancel condition is the predetermined complex movement, which is determined to be performed in the step ST1, being determined to be no longer performed. Specifically, in a typical example, the controller 30 switches the valve position of the control valve 170 to the first valve position in a case of determining that the complex movement including a boom raising movement and an arm closing movement, which is determined to be performed in the step ST1, is no longer performed based on an output from the operation sensor 29. Specifically, the controller 30 switches the valve position of the control valve 170 to the first valve position when the complex movement including a boom raising movement and an arm closing movement is changed to a single movement including only a boom raising movement.

In the example described above, the controller 30 moves the control valve 170 serving as a straight-travel valve while a predetermined complex movement, which is a complex movement including an arm closing movement by a full lever operation and a boom raising movement by a non-full lever operation, is being performed. However, the controller 30 may move the control valve 170 serving as a straight-travel valve while any other predetermined complex movement is being performed, such as a complex movement including an arm closing movement by a full lever operation and a boom lowering movement by a non-full lever operation, a complex movement including an arm closing movement by a full lever operation and a bucket closing movement by a non-full lever operation, a complex movement including an arm opening movement by a full lever operation and a boom raising movement by a non-full lever operation, a complex movement including an arm opening movement by a full lever operation and a boom lowering movement by non-full lever operation, a complex movement including an arm opening movement by a full lever operation and a bucket opening movement by a non-full lever operation, and the like.

A complex movement including an arm closing movement by a full lever operation and a boom raising movement performed by a non-full lever operation, which is performed to realize the plowing-out work, may be a complex movement including an arm closing movement by a full lever operation and a boom raising movement by a non-full lever operation, which is performed to realize any other work such as an excavation work, or may be a complex movement including an arm closing movement by a full lever operation and a boom raising movement performed by a non-full lever operation, which is performed in the air (in a state in which the excavation attachment does not touch the soil or the like).

As described above, as illustrated in FIG. 1 and FIG. 2, the excavator 100 according to an embodiment of the present invention includes the lower travelling body 1, the upper rotating body 3 mounted rotatably on the lower travelling body 1, the excavation attachment, which is an example of the attachment attached to the upper rotating body 3 and including the boom 4, the arm 5, and the bucket 6, the control valve 170 serving as a straight-travel valve that can merge flows of the operating oil, which are discharged from a plurality of hydraulic pumps respectively, with each other, and the controller 30 serving as a control device that can control the functioning of the control valve 170. The controller 30 moves the control valve 170 and performs the pressure drop inhibiting process while at least two selected from the boom 4, the arm 5, and the bucket 6 are simultaneously moving in a non-travelling state. In the example illustrated in FIG. 2, the control valve 170 serving as a straight-travel valve is situated between the right main pump 14R and the control valve 171R on the right center bypass oil path 40R, and is situated at the point at which the left parallel oil path 42L is parted to the left main pump 14L side and the control valve 172 side. Basically, the valve position of the control valve 170 serving as a straight-travel valve is switchable while travelling operation devices are being operated. However, in the present embodiment, the valve position of the control valve 170 is switchable even while no travelling operation devices are being operated. Specifically, the control valve 170 serving as a straight-travel valve is switchable between the first valve position at which the control valve 170 can supply the operating oil discharged from the left main pump 14L to the left parallel oil path 42L and can supply the operating oil discharged from the right main pump 14R to the right center bypass oil path 40R, and the second valve position at which the control valve 170 can supply the operating oil discharged from the left main pump 14L to the right center bypass oil path 40R and can supply the operating oil discharged from the right main pump 14R to the left parallel oil path 42L. Moreover, the control valve 170 serving as a straight-travel valve can supply flows of the operating oil, which are discharged from the left main pump 14L and the right main pump 14R respectively, after merging them with each other, to the left parallel oil path 42L and the right center bypass oil path 40R respectively when the control valve 170 is at the middle valve position between the first valve position and the second valve position.

When at least two selected from the boom 4, the arm 5, and the bucket 6 are simultaneously moving in a non-travelling state is, for example, when at least two selected from the boom 4, the arm 5, and the bucket 6 are simultaneously being operated in a non-travelling operation.

The controller 30 may determine whether at least two selected from the boom 4, the arm 5, and the bucket 6 are simultaneously moving in a non-travelling state or not based on an output from the operation sensor 29. Alternatively, the controller 30 may determine whether at least two selected from the boom 4, the arm 5, and the bucket 6 are simultaneously moving or not based on an output from the boom angle sensor, the arm angle sensor, the bucket angle sensor, and the like. Alternatively, the controller 30 may determine whether the excavator 100 is in a travelling state or not based on an output from a positioning device such as a GNSS and the like. Alternatively, the controller 30 may determine whether at least two selected from the boom 4, the arm 5, and the bucket 6 are simultaneously moving in a non-travelling state or not based on an output from an image sensor such as a space recognition device (a camera or a LIDAR) mounted on the upper rotating body 3 and the like.

The configuration described above has an effect of enabling reducing pressure drop that may occur while a complex operation for moving at least two selected from the boom cylinder 7, the arm cylinder 8, and the bucket cylinder 9 is being performed. Hence, the configuration described above has an effect of enabling improving the fuel efficiency or improving the moving speed of the excavation attachment.

The configuration described above, which is a configuration for performing the pressure drop inhibiting process by using the existing straight-travel valve (the control valve 170), has an effect of enabling reducing pressure drop in the operating oil lines without employing a relatively expensive method such as changing the fixed throttle (the throttle 60) to a variable throttle, situating an electromagnetic proportional valve on the pilot lines of the control valves 176, or the like. Moreover, the configuration described above, which is a configuration for performing the pressure drop inhibiting process by using the existing straight-travel valve (the control valve 170), has an effect of enabling reducing pressure drop in the operating oil lines without employing a structure or a configuration that needs a separate space for installation. Moreover, the configuration described above has an effect of enabling omitting an electromagnetic proportional valve from an excavator including the electromagnetic proportional valve on the pilot lines of the control valves 176 and reducing the production costs.

The controller 30 may move the control valve 170 serving as a straight-travel valve while a complex movement including an arm closing movement and either or both of a boom raising movement and a bucket closing movement is being performed.

Alternatively, the controller 30 may move the control valve 170 serving as a straight-travel valve only in a case where the operation amount of an arm closing operation is greater than the operation amount of a boom raising operation and the operation amount of a bucket closing operation. That is, the controller 30 does not need to move the control valve 170 in a case where the operation amount of an arm closing operation is less than or equal to the operation amount of a boom raising operation even while a complex movement including an arm closing movement and a boom raising movement is being performed, because it can be estimated that a pressure drop occurring in the operating oil lines is low.

As illustrated in FIG. 2, the excavator 100 may include the left main pump 14L serving as a first hydraulic pump that can supply the operating oil to the left travelling hydraulic motor 20L and the right travelling hydraulic motor 20R, and the right main pump 14R serving as a second hydraulic pump that can supply the operating oil to the right travelling hydraulic motor 20R.

In this case, the controller 30 may move the control valve 170 serving as a straight-travel valve to merge the operating oil discharged from the left main pump 14L and the operating oil discharged from the right main pump 14R with each other as illustrated in FIG. 7, in a case where the discharging pressure P2 of the right main pump 14R is higher than the discharging pressure P1 of the left main pump 14L while at least two selected from the boom 4, the arm 5, and the bucket 6 are simultaneously moving in a non-travelling state.

The control valve 170 serving as a straight-travel valve may be switchable between the first valve position at which the left main pump 14L and the left travelling hydraulic motor 20L are brought into communication and the right main pump 14R and the right travelling hydraulic motor 20R are brought into communication as illustrated in FIG. 3, and the second valve position at which the left main pump 14L is brought into communication with each of the left travelling hydraulic motor 20L and the right travelling hydraulic motor 20R as illustrated in FIG. 4.

In this case, the control valve 170 may merge the operating oil discharged from the left main pump 14L and the operating oil discharged from the right main pump 14R with each other when its valve position is at the middle valve position between the first valve position and the second valve position.

This configuration has an effect of enabling reducing pressure drop that may occur while a complex operation for moving at least two selected from the boom cylinder 7, the arm cylinder 8, and the bucket cylinder 9 is being performed, because reducing a differential pressure between the discharging pressure P2 of the right main pump 14R and the discharging pressure P1 of the left main pump 14L can reduce a differential pressure between the pressure of the operating oil on the upstream side of the throttle 60 and the pressure of the operating oil on the downstream side of the throttle 60. Hence, this configuration has an effect of, for example, enabling improving the fuel efficiency or improving the moving speed of the excavation attachment. In the embodiment described above, the case in the plowing-out work has been illustrated. However, the work to which the present invention can be applied is not limited to the plowing-out work. In a case where the opening area of the PC port of the control valves of the hydraulic circuit on the right main pump 14R side is smaller than the opening area of the PC port of the control valves of the hydraulic circuit on the left main pump 14L side, the discharging pressure of the right main pump 14R is higher than the discharging pressure of the left main pump 14L. The present invention can be applied to any type of work in which, as described, the discharging pressure of the right main pump 14R is higher than the discharging pressure of the left main pump 14L depending on the difference in the opening areas of the PC ports of the control valves situated on the left and right hydraulic circuits.

A preferable embodiment of the present invention has been described above. However, the present invention is not limited to the embodiment described above and an embodiment described below. Various modifications, replacements, and the like are applicable to the embodiment described above and an embodiment described below without departing from the scope of the present invention. The features described with reference to the embodiment described above and an embodiment described below may be appropriately combined unless the features technically conflict.

For example, in the embodiment described above, the control valve 170 is formed as a 4-port and 2-chamber spool valve. The controller 30 controls the operating oil discharged from the left main pump 14L and the operating oil discharged from the right main pump 14R to be merged with each other by using the middle valve position of the control valve 170 between the first valve position and the second valve position.

However, the control valve 170 may be formed as a 4-port and 3-chamber spool valve having a middle valve position as an independent third valve position. That is, the control valve 170 may be formed as a 4-port and 3-chamber spool valve having an independent third valve position at which a merging path joining the left parallel oil path 42L and the right center bypass oil path 40R with each other is provided.

The control valve 170 may be able to change the opening area of the merging path joining the left parallel oil path 42L and the right center bypass oil path 40R with each other, depending on the stroke amount of the merging path.

What is claimed is:

1. An excavator, comprising:
a lower travelling body;
an upper rotating body mounted rotatably on the lower travelling body;
an attachment attached to the upper rotating body and including a boom, an arm, and a bucket;
a first hydraulic pump and a second hydraulic pump;
a control valve configured to merge first operating oil discharged from the first hydraulic pump and second operating oil discharged from the second hydraulic pump with each other; and
a processing circuit configured to control functioning of the control valve,
wherein the processing circuit is configured to, while at least two selected from the boom, the arm, and the bucket are moving simultaneously in a non-travelling state,
compare a first discharging pressure of the first hydraulic pump and a second discharging pressure of the second hydraulic pump to determine whether the second discharging pressure is higher than the first discharging pressure, and
move the control valve to merge the first operating oil and the second operating oil at the control valve in response to determining that the second discharging pressure is higher than the first discharging pressure.

2. The excavator according to claim 1, further comprising:
a left travelling hydraulic motor and a right travelling hydraulic motor,
wherein the first hydraulic pump is configured to supply the first operating oil to the left travelling hydraulic motor and to the right travelling hydraulic motor, and the second hydraulic pump is configured to supply the second operating oil to the right travelling hydraulic motor.

3. The excavator according to claim 2,
wherein the control valve is configured to switch between a first valve position and a second valve position, the first valve position causing the first hydraulic pump to communicate with the left travelling hydraulic motor and causing the second hydraulic pump to communicate with the right travelling hydraulic motor, the second valve position causing the first hydraulic pump to communicate with each of the left travelling hydraulic motor and the right travelling hydraulic motor, and
the control valve is configured to merge the first operating oil and the second operating oil with each other when the control valve is at a middle valve position between the first valve position and the second valve position.

4. The excavator according to claim 1,
wherein the processing circuit is configured to move the control valve while a complex operation is being performed, the complex operation including an arm closing operation and either or both of a boom raising operation and a bucket closing operation.

5. The excavator according to claim 4,
wherein an operation amount of the arm closing operation is greater than an operation amount of the boom raising operation and an operation amount of the bucket closing operation.

6. The excavator according to claim 1,
wherein the processing circuit is configured to, while a complex operation for moving two hydraulic actuators is being performed in the non-travelling state, merge the first operating oil and the second operating oil with each other in a case where a difference between load pressures on the two hydraulic actuators is greater than a predetermined value, and prevent the first operating oil and the second operating oil from being merged with each other in a case where the difference between the load pressures on the two hydraulic actuators is less than or equal to the predetermined value.

7. The excavator according to claim 1, further comprising:
a left travelling hydraulic motor and a right travelling hydraulic motor,
wherein the first hydraulic pump is configured to supply the first operating oil to the left travelling hydraulic motor and to the right travelling hydraulic motor, and the second hydraulic pump is configured to supply the second operating oil to the right travelling hydraulic motor, the control valve is configured to switch between a first valve position and a second valve position, the first valve position causing the first hydraulic pump to communicate with the left travelling hydraulic motor and causing the second hydraulic pump to communicate with the right travelling hydraulic motor, the second valve position causing the first hydraulic pump to communicate with each of the left travelling hydraulic motor and the right travelling hydraulic motor, and the control valve is at the first valve position while only a travelling operation device is being operated or while only an attachment operation device is being operated, and is at the second valve position while the travelling operation device and the attachment operation device are simultaneously being operated.

8. The excavator according to claim 1, further comprising:
a boom cylinder configured to drive the boom,
wherein the first hydraulic pump and the second hydraulic pump are configured to supply the first operating oil and the second operating oil, respectively, to the boom cylinder without passing the first operating oil and the second operating oil, respectively, through the control valve.

9. The excavator according to claim 1,
an arm cylinder configured to drive the arm,
wherein the first hydraulic pump and the second hydraulic pump are configured to supply the first operating oil and the second operating oil, respectively, to the arm cylinder without passing the first operating oil and the second operating oil, respectively, through the control valve.

10. The excavator according to claim 1, further comprising:
a left travelling hydraulic motor and a right travelling hydraulic motor,
wherein the first hydraulic pump is configured to supply the first operating oil to the left travelling hydraulic motor and to the right travelling hydraulic motor, and the second hydraulic pump is configured not to supply the second operating oil to the left travelling hydraulic motor and configured to supply the second operating oil to the right travelling hydraulic motor.

11. The excavator according to claim 1, further comprising:
an arm cylinder configured to drive the arm, wherein
the second hydraulic pump is configured to supply the second operating oil to the arm cylinder by passing the second operating oil through a throttle, and
the first hydraulic pump is configured to supply the first operating oil to the arm cylinder without passing the first operating oil through the throttle.

12. The excavator according to claim 11,
wherein an operating oil pressure on an upstream side of the throttle and an operating oil pressure on a downstream side of the throttle become a same value in response to the control valve being moved.

13. An excavator comprising:
a lower travelling body;
an upper rotating body mounted rotatably on the lower travelling body;
an attachment attached to the upper rotating body and including a boom, an arm, and a bucket;
a control valve configured to merge flows of an operating oil, which are discharged from a plurality of hydraulic pumps respectively, with each other; and
a processing circuit configured to control functioning of the control valve,
wherein the processing circuit is configured to move the control valve while at least two selected from the boom, the arm, and the bucket are moving simultaneously in a non-travelling state,
the plurality of hydraulic pumps include a first hydraulic pump and a second hydraulic pump, and
the control valve is configured to switch between a first valve position and a second valve position, and to merge the operating oil discharged from the first hydraulic pump and the operating oil discharged from the second hydraulic pump with each other in a case where the control valve is at a middle valve position between the first valve position and the second valve position.

14. An excavator comprising:
a lower travelling body;
an upper rotating body mounted rotatably on the lower travelling body;
an attachment attached to the upper rotating body and including a boom, an arm, and a bucket;
a control valve configured to merge flows of an operating oil, which are discharged from a plurality of hydraulic pumps respectively, with each other; and
a processing circuit configured to control functioning of the control valve,
wherein the processing circuit is configured to move the control valve while at least two selected from the boom, the arm, and the bucket are moving simultaneously in a non-travelling state,
the processing circuit is configured to control the flows of the operating oil, which are discharged from the plurality of hydraulic pumps respectively, to be merged with each other while at least two selected from the boom, the arm, and the bucket are moving simultaneously in the non-travelling state, and
the processing circuit is configured to control the flows of the operating oil, which are discharged from the plurality of hydraulic pumps respectively, to be excluded from being merged with each other while one selected from the boom, the arm, and the bucket is moving alone in the non-travelling state.

* * * * *